United States Patent [19]

Becker

[11] 4,148,866
[45] Apr. 10, 1979

[54] LOW ENERGY AMMONIA SYNTHESIS PROCESS

[75] Inventor: Colman L. Becker, Houston, Tex.

[73] Assignee: Pullman Incorporated, Chicago, Ill.

[21] Appl. No.: 729,459

[22] Filed: Oct. 4, 1976

[51] Int. Cl.² ............................ C01C 1/02; C01C 1/04
[52] U.S. Cl. ..................................... 423/359; 422/148
[58] Field of Search ............... 423/359, 360, 361, 362, 423/363, 352; 23/260, 263, 288, 289, 281

[56] References Cited

U.S. PATENT DOCUMENTS

| 1,679,792 | 8/1928 | Slade et al. | 423/359 |
| 3,343,916 | 9/1967 | Cahn et al. | 423/359 |
| 3,441,393 | 4/1969 | Finneran et al. | 423/359 X |
| 3,743,699 | 7/1973 | Bogart | 423/359 |

FOREIGN PATENT DOCUMENTS 1186939  4/1970  United Kingdom.

OTHER PUBLICATIONS

Kirk-Othmer Encyclopedia of Chemical Technology, 2nd Ed., vol. 2, 1963, pp. 272 & 273.

Primary Examiner—Edward J. Meros
Attorney, Agent, or Firm—Kurt S. Myers; C. W. Crady

[57] ABSTRACT

An improved synthesis loop for the production of ammonia, has a low pressure, i.e., less than 100 atmospheres, a water absorption recovery system which utilizes low level heat recovered from the process for producing the synthesis gas to distill the ammonia-water mixture and an ammonia absorption refrigeration system which utilizes the same distillation column for both the water absorption system and the refrigeration system.

15 Claims, 2 Drawing Figures

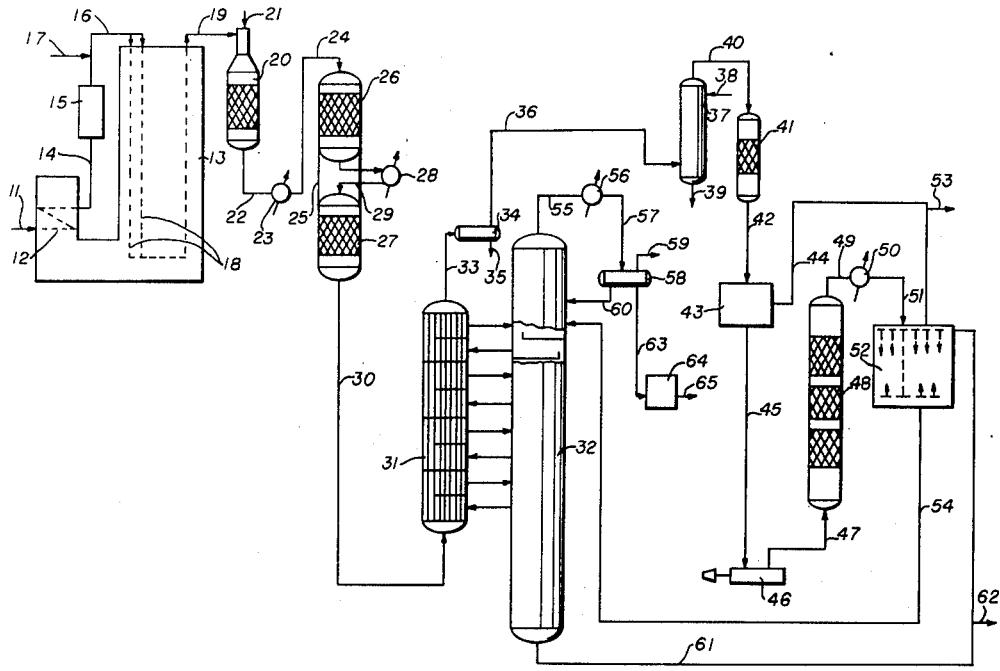

LOW ENERGY AMMONIA SYNTHESIS PROCESS

BACKGROUND OF THE INVENTION

1. Field of the Invention

The present invention is directed to an improved process for the production of ammonia. More specifically, the present invention involves a low energy synthesis process for producing ammonia. One aspect is that the ammonia synthesis is carried out at low pressures, i.e., at pressures less than 100 atmospheres (atms.). Another aspect is that the ammonia is recovered from the synthesis effluent stream by scrubbing with water or a water absorption system and then distilling the ammonia-water mixture using the low level heat recovered from the process used for producing the synthesis gas. Still another aspect is to refrigerate the product ammonia in an ammonia absorption system and using a single distillation system to reconstitute the absorbent and purify the ammonia for both the water absorption system and the refrigeration system.

2. Prior Art

A commercial ammonia process is disclosed in U.S. Pat. No. 3,441,393. In such a process, ammonia synthesis gas is produced in a series of steps. A raw synthesis or hydrogen-rich gas is formed by partial oxidation or primary reforming of a hydrocarbon, which can be either liquid or gaseous at normal temperatures and pressures. The carbon monoxide in the raw synthesis gas is converted in a shift conversion zone to carbon dioxide and further hydrogen. The hydrogen-rich gas is then scrubbed to remove the carbon dioxide. Further purification steps such as methanation may be used to obtain a synthesis gas having hydrogen and nitrogen in approximately a 3 to 1 ratio. The synthesis gas is converted to ammonia and the ammonia is recovered by using mechanical refrigeration compressors.

The pressure in commercial ammonia synthesis loops generally exceed 100 atmospheres and most exceed 150 atmospheres. However, pressures of 1 to 68 atmospheres are disclosed in U.S. Pat. No. 2,550,389, pressures of 20 to 400 atmospheres are disclosed in U.S. Pat. No. 3,368,869 and pressures of 40–120 atmospheres are disclosed in U.S. Pat. No. 3,957,449, although no commercial plant is known which operates at low pressures, i.e., less than 100 atms.

U.S. Pat. No. 3,397,959 discloses an isopeistic process (i.e., essentially same pressure throughout the process) and apparatus for the production of ammonia. In this process the steps of preparing the synthesis gas and the synthesis of the ammonia are all conducted at a pressure of 80 to 220 atmospheres.

A water recovery process for ammonia is disclosed in an article by Pagani and Zardi, "New separation process gives cheaper ammonia," published in Hydrocarbon Processing, July, 1972 on pages 106 to 110.

In a specific process using a closed ammonia-water absorption-refrigeration cycle, a process is disclosed in U.S. Pat. No. 3,743,699 which does not require mechanical compression of the refrigerant.

SUMMARY OF THE INVENTION

The present invention is directed to the improvements in the process for the production of ammonia wherein the hydrogen and nitrogen are reacted at pressures between 20 and 100 atmospheres to produce an effluent containing ammonia. The ammonia in the effluent is recovered by scrubbing with water or a water absorption system to form a water-ammonia mixture and recovering the ammonia from the water-ammonia mixture by distillation using the heat recovered from the raw synthesis gas. The product ammonia is refrigerated in an ammonia absorption system and the same distillation system is used to reconstitute the absorbent and purify the ammonia for both the water absorption system and the refrigeration system.

DETAILED DESCRIPTION OF THE PREFERRED EMBODIMENTS

Figure 1:
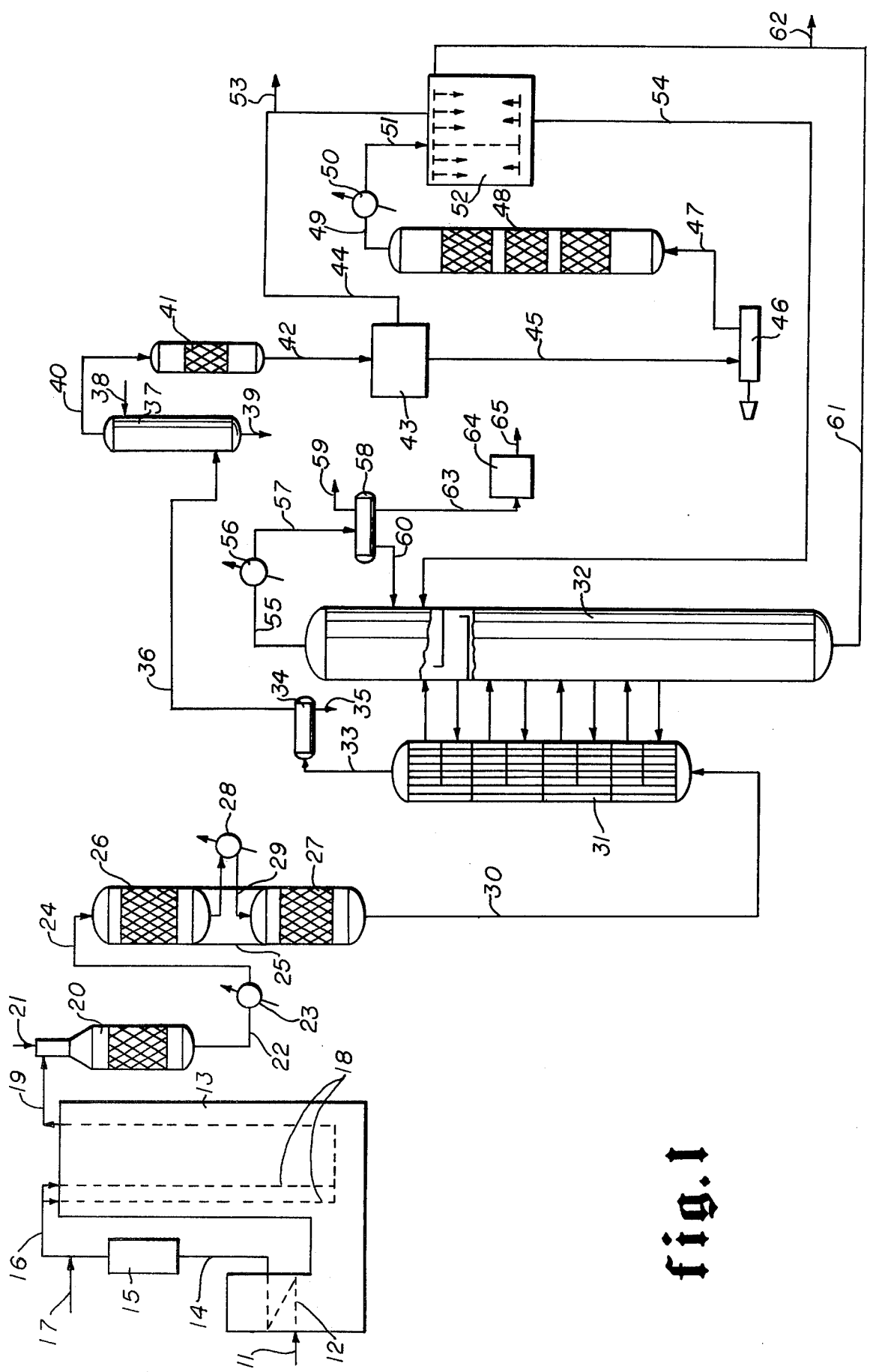
FIG. 1 is a flow diagram which illustrates one embodiment of the present invention.

The present invention is directed to a synthesis process for producing ammonia which materially reduces the energy requirements over the present commercial processes. It has been found according to the present invention that the energy requirements are reduced by the integration of a low pressure synthesis process with a water recovery system which utilizes the low temperature level heat in the raw synthesis gas to recover the ammonia of anhydrous quality.

In a process for producing ammonia a synthesis gas is formed which contains at least three mols of hydrogen for each mol of nitrogen for the following reaction to occur:

$$3H_2 + N_2 \rightleftharpoons 2NH_3$$

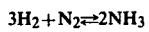

The source of hydrogen is most commonly a hydrocarbon and the source of nitrogen is usually air or an air separation apparatus. The common commerical processes for producing the raw synthesis gas are steam reforming and partial oxidation (including coal gasification) although other processes may be employed to produce the raw synthesis gas. A wide variety of hydrocarbon and carbon-hydrogen containing feeds can be employed to produce the raw synthesis gas ranging from normally gaseous materials to solid materials.

In the steam reforming process, hydrocarbons are contacted with steam in the presence of a steam reforming catalyst under conditions which favor the production of a raw hydrogen-rich gas. Gaseous hydrocarbons, or liquid hydrocarbons which can be placed in the gaseous form, such as natural gas, LPG or naphthas boiling in the gasoline region, and steam are passed through tubes containing steam reforming catalyst in the primary reforming process. Since the primary reforming process is endothermic, heat is supplied to produce the raw hydrogen-rich gas from the hydrocarbon material. Primary reforming is followed by secondary reforming where the raw hydrogen-rich gas, which still contains hydrocarbons, is contacted with steam and oxygen (as air or oxygen-enriched air) in the presence of steam reforming catalyst to produce the raw synthesis gas.

The steam reforming catalysts which may be employed in primary reforming and secondary reforming are nickel, nickel oxide, chromia, molybdenum, mixtures thereof, etc. The details of steam reforming catalysts are known as well as the operating conditions, see for example U.S. Pat. No. 3,119,667.

In the partial oxidation process, hydrocarbons are contacted with commercially pure oxygen or enriched air and usually some steam in the absence of a catalyst under conditions which favor the production of a raw hydrogen-rich gas. The hydrocarbon feeds which may be employed in partial oxidation are the heavier feeds such as crude oil, residual oils and coal. The details of the partial oxidation process are known and are not a part of the present invention.

The pressures used to produce the raw synthesis gas may vary between about 1 and 100 atmospheres or higher, depending upon the specific process employed. According to the present invention, it is preferred that the pressure of a steam reforming process to produce the raw hydrogen-rich gas be between about 20 to 70 atmospheres. The pressures employed in partial oxidation may range between 7 and 70 atmospheres or more. Significant to the present invention is that the ammonia synthesis, which will be described in detail hereinafter, is carried out at a pressure which is essentially that used in the process for producing the synthesis gas.

The raw synthesis gas obtained from steam reforming, partial oxidation or the like comprises hydrogen, nitrogen and carbon monoxide together with a number of other gases. The amount of air used in the steam reforming or partial oxidation is determined to provide the proper amount of nitrogen in the synthesis gas. The raw synthesis gas from steam reforming or partial oxidation is at an effluent temperature of about 540° C. to 1210° C. due to the heat required to produce the raw synthesis gas. Accordingly, the effluent of the specific raw synthesis gas process used is usually cooled and energy recovered from the effluent gas before carrying out the shift conversion process. This shift conversion process step is to convert the carbon monoxide present in the raw synthesis gas effluent by reacting with steam in the presence of a catalyst to form carbon dioxide and additional hydrogen, by the water gas shift conversion reaction.

$$CO + H_2O \rightleftharpoons CO_2 + H_2$$

Since the water gas shift conversion is exothermic, it is preferred to carry out the reaction in a series of catalyst beds. The cooling requirements between beds will be determined by the reaction temperatures, the relative volumes of the catalyst beds and the quantity of carbon monoxide which is to be reacted. The shift conversion may be carried out at high temperatures, i.e., inlet temperatures of about about 315° C. to 425° C., or may be carried out at low temperatures, i.e., inlet temperatures of about 220° C. to 275° C., or may be a combination of high temperature and low temperature. The shift conversion catalysts which may be employed in the shift conversion process are iron oxide, nickel oxide, cobalt oxide, tungsten oxide, chromia, molybdena, etc. which are known in the art as high temperature shift catalyst and a low temperature shift catalyst, for example, consisting of copper, zinc and one or more of the elements selected from the group consisting of chromium, tungsten, silicone, vanadium, and molybdenum, with all these elements being present in either a free or chemically bonded state (U.S. Pat. No. 1,809,978). Shift conversion catalysts, whether a high temperature shift catalyst or a low temperature shift catalyst, are well known and commercially available. The pressures employed in the shift conversion are substantially the same as those used in the process step for producing the raw synthesis gas.

In a preferred embodiment of the shift conversion process, the carbon monoxide is converted in a high temperature shift conversion zone followed by a low temperature shift conversion zone. The raw synthesis gas is introduced to the high temperature shift conversion zone at an inlet temperature of about 315° C. to 425° C., preferably about 340° C. to 400° C., and has an outlet temperature of about 370° C. to 485° C., preferably about 395° C. to 430° C. The gas from the high temperature shift conversion zone may be cooled by means of indirect heat exchange with a colder stream or direct heat exchange by injecting water or steam. The cooled gas is introduced to the low temperature shift conversion zone at an inlet temperature of about 190° C. to 275° C., and due to the heat of reaction liberated, has an outlet temperature of about 230° C. to 290° C.

As to the present invention, the effluent from the shift conversion process is a source of low level heat. This low temperature level heat is used in the ammonis synthesis loop, as will be described in more detail hereinafter. The effluent from the shift conversion process now comprises hydrogen, nitrogen and carbon dioxide besides other gases. Accordingly, the carbon dioxide present in the effluent from the shift conversion process is removed in any suitable manner.

Generally, it is preferred to contact the effluent from the shift conversion process with a material which is a selective absorbent for carbon dioxide. Any of the well known absorbent systems, whether chemical or physical, may be used. The carbon dioxide is usually removed by contacting or scrubbing the effluent from the shift conversion process with the absorbent in an absorption zone, preferably a countercurrent packed or trayed tower. The rich absorbent solution, i.e. carbon dioxide-containing absorbent, can be readily regenerated for reuse. Usually the regeneration is carried out in a stripper column where the rich absorbent solution is heated and/or reduced in pressure which separates the carbon dioxide and absorbent.

After removal of carbon dioxide, the scrubbed gas is further treated to purify the gas and to produce the desired synthesis gas. The composition of the effluent from the carbon dioxide scrubbing process is hydrogen and nitrogen in the proper ratio together with a small amount of carbon oxides. Since the carbon oxides are poisons to the ammonia synthesis catalysts, these gases are reacted with hydrogen in a methanation process to produce methane and steam. Besides a methanation process, the scrubbed gas may be treated with molecular sieves to remove impurities in the gas including water or the raw synthesis gas recovered from the methanation process is cooled to condense out the water formed. Alternatively, the raw synthesis gas may be purified by washing with nitrogen.

According to the present invention, the ammonia synthesis loop is unique. The synthesis loop pressure is low, i.e., less than 100 atmospheres. More specifically, the pressure in the synthesis loop ranges between 20 to 70 atmospheres and thus corresponds in magnitude to or may be lower than the pressure used in the specific process for producing the raw synthesis gas. Further, according to the present invention, the energy required for the recovery of the ammonia produced in the low pressure ammonia synthesis loop is obtained substantially from the low level heat recovered from the synthesis gas after the shift conversion process. More specifically, the effluent from the ammonia synthesis converter is scrubbed with water to form a water-ammonia mixture and this mixture is distilled in a distillation column which is heated by heat exchange with the effluent raw synthesis gas from the shift conversion process. The ammonia synthesis loop of the present invention is a low energy ammonia synthesis loop.

The ammonia synthesis according to the present invention is preferably carried out by reacting a combined steam of fresh and recycle synthesis gas in the presence of an ammonia synthesis catalyst at a pressure less than 100 atmospheres. In a specific embodiment, the pressure may range between 20 to 50 atmospheres which corresponds in magnitude to the pressure in most commercial steam reforming processes which produce the hydrogen-rich or raw synthesis gas. Any ammonia synthesis catalyst may be employed. For example, the catalyst may be any of the well known iron or modified iron synthesis catalysts now commercially used. The ammonia synthesis reaction is carried out in an ammonia synthesis converter(s) which holds the bed(s) of catalyst. One or more than one ammonia synthesis converter may be used. A vertical ammonia synthesis has the beds of catalyst in a vertical configuration (U.S. Pat. No. 3,475,136) whereas the beds are horizontally spaced in a horizontal ammonia synthesis converter (U.S. Pat. No. 3,567,404). One embodiment is a three bed configuration which maximizes the conversion of the synthesis gas per pass through the ammonia synthesis conveter(s) to ammonia. When using commercial iron catalysts the temperature within the ammonia synthesis converter is maintained between 260° C. and 540° C., preferably between about 315° C. and 424° C. Indirect heat exchange or direct heat exchange, by introducing cool synthesis gas at various points within the ammonia synthesis converter, is provided to maintain the temperature in the beds of ammonia synthesis catalyst.

The effluent from the ammonia synthesis converter is cooled. In the ammonia synthesis loop of the present invention, the effluent from the ammonia synthesis converter(s) is scrubbed with water to remove the ammonia from the unreacted synthesis gas. The water scrubbing systems which may be used consist of absorbing the ammonia in water and removing the considerable heat of absorption. In general, the ammonia-water absorption system may be a system using vertical wetted wall exchanger absorption, multistage packed tower absorption, concurrent multistage heat exchange absorption or a trayed column with heat transfer area on each tray. Each system can reduce the amount of ammonia in the unreacted synthesis gas which is recycled to about 10 ppm. Each system can produce an ammonia-water mixture or aqua concentration of about 20 to 80 weight percent depending on the pressure and concentration of ammonia in the effluent from the ammonia synthesis converter(s). While each absorption system is different in detail, each comprises an absorber which scrubs the effluent from the ammonia synthesis converter with water to absorb the ammonia and form an ammonia water mixture.

To recover the ammonia from the ammonia-water mixture, the mixture is distilled. Most of the energy for the ammonia distillation is provided by the shift conversion effluent. The aqua ammonia from the absorber is fractionated to produce ammonia overhead (with less than 500 ppm water) and water at the bottom (with less than 100 ppm ammonia). The liquid ammonia which is recovered overhead as a vapor pressure in excess of 13 atmospheres which must be cooled to be sent to storage at atmospheric pressure.

The distillation column used in accordance with the present invention is heated by an integrated distillation scheme. By this scheme, liquid in the distillation column is heated by removing liquid at several levels from the distillation column and passing the liquid at each level into a heat exchanger whereby the liquid is heated to aid in separation of the ammonia-water mixture. Each withdrawal level of liquid for heat exchange is referred to as a side reboiler. A number of side reboilers may be used and the effluent from the shift conversion is used as the heating medium. The side reboilers may be a series of separate and distinct heat exchangers or preferably grouped in series as one or more heat exchangers with the shift effluent flowing through the tubes and a series of compartments defining each side reboiler on the shell side. The advantage of the integrated distillation scheme of the present invention is to use the low level heat from the process gas to provide a low energy synthesis loop. In addition such a low energy synthesis loop allows for an overall lower energy ammonia process.

The liquid ammonia recovered from the distillation column is cooled preferably by absorption refrigeration for storage at atmospheric pressure. In the refrigeration section, the liquid ammonia is cooled and the dissolved inerts removed by absorption refrigeration, i.e., flashing the liquid ammonia in multiple stages (from 16.2 atms. and 37.7° C. to 1 atms. and −33.3° C. in six stages). The flashed vapors generated in each stage are recovered by absorption with water and/or aqua ammonia from the distillation column. In the present invention, the absorbed ammonia is returned as aqua ammonia to the same distillation column for fractionation.

The unreacted synthesis gas from the ammonia absorber in the water scrubbing step is recycled. Before being recycled to the ammonia synthesis converter, however, the recycle gas must be dried. A preferred embodiment is to pass the recycle gas through molecular sieves which will remove water and other impurities.

In the low energy ammonia synthesis loop of the present invention, the only compression required is to compress the recycle gas. The recycle compressor is preferably positioned after the removal of water by the molecular sieves or other water removing system used, such as using triethylene glycol. However, the recycle compressor may be positioned before the drying.

For a better understanding of the present invention, reference is had to the following example and specific embodiment as shown in the drawings.

It will be understood that various valves, pumps, controls and related auxiliary equipment are required in practicing the present invention. In the interest of simplicity, such items have not been shown or described since the need for them, their location and their manner of use are well known to those skilled in the art.

Referring to FIG. 1, a specific embodiment is illustrated which employs primary and secondary reforming to produce the raw synthesis gas. A hydrocarbon feed, which may be natural gas or naphtha, is introduced in line 11. Specifically, a feed, 2636.9 mols/hour (MPH) of natural gas, is introduced in line 11 and preheated to about 400° C. in preheater 12, which may be in the convective section of the primary reformer 13. The gas is then passed by line 14 to a pretreater 15. The hydrocarbon feed may require pretreatment to eliminate or decrease the concentration of undesirable components which may have a deleterious effect on subsequent processing steps. For example, many hydrocarbon feeds contain sulfur which is a steam reforming poison. In such a case, the pretreater 15 is a known desulfurizer such as a zinc oxide guard chamber. With certain feeds, the pretreater 15 may preceed the preheater 12. The effluent from the pretreater 15 is removed by line 16 and is mixed with 10,004 MPH of steam introduced by line 17, said steam having a temperature of about 415° C. and a pressure of 47.6 atmospheres. The mixed stream is further preheated to 510° C. and introduced to tubular primary steam reforming reaction zones containing a reforming catalyst, such as tubes 18 located in the primary reformer 13. The primary reforming is carried out at an outlet pressure of about 40 atmospheres and the temperature of the raw synthesis gas in line 19 is about 808° C. The raw synthesis gas from the primary steam reforming is fed to the secondary reformer 20. In line 21 is introduced 4122.9 MPH of process air which has been compressed and mixed with 389.7 MPH of steam. The mixed steam and air stream is at a temperature of about 693° C. when introduced to secondary reformer 20. The effluent from the secondary reformer 20 or the raw synthesis gas is passed in line 22 in indirect heat exchange with several streams. The raw synthesis gas is passed through heat exchanger 23 in indirect heat exchange with water to produce superheated steam at 510° C. and 103 atmospheres. The raw synthesis gas or effluent is then passed by line 24 to shift converters 25, having a high temperature stage 26 and a low temperature 27. The feed to the high temperature shift stage 26 is at a rate of 21718.8 MPH and an inlet temperature of about 371° C. The effluent from the high temperature shift zone 26 is at a temperature of 430° C. and is passed in indirect heat exchange through exchanger 28 to reduce its temperature such that the gas passed through line 29 to the inlet of the low temperature shift stage 27 is about 211° C. The effluent is removed from the low temperature shift stage 27 by line 30 having a composition of 9311.1 MPH of hydrogen, 3041.2 MPH nitrogen, 53.8 MPH methane, 39.0 MPH argon, 2761.8 MPH carbon dioxode, 45.8 MPH carbon monoxide, and 6466.1 MPH water at a temperature of about 238° C. The effluent is passed through a heat exchanger 31 which may be a series of side reboilers for heating the material in the distillation column 32 which will be explained in further detail hereinafter. The effluent from the heat exchanger 31 is at a temperature of about 82° C. and approximately a pressure of 36 atmospheres. The effluent is passed by line 33 to a condensor 34 wherein 6418.1 MPH of water are removed by line 35. The raw gas is removed by line 36 and is introduced to a carbon dioxide absorber 37. The raw gas introduced to absorber 37 is contacted with an absorbent introduced by line 38 which may be a commercial regenerable absorber for carbon dioxide such as, for example, dimethylether of polyethylene glycol as a physical solvent (Allied Chemical's Selexol Process). The rich absorbent which is passed counter-current to the gases in absorber 37 is removed by line 39. The gas introduced in line 36 to the absorber 37 contains 2761.8 MPH of carbon dioxide while the gases removed by line 40 contains 12.5 MPH carbon dioxide. The rich solvent from line 39 is passed to a carbon dioxide stripper (not shown) to regenerate the solvent for re-introduction by line 38. The gas in line 40 also contains 45.8 MPH carbon monoxide and to remove the carbon oxides is passed to a methanator 41. The methanator effluent removed by line 42 contains 9039.4 MPH hydrogen, 3012.8 MPH nitrogen, 11.0 MPH methane, 38.6 MPH argon, and 70.8 MPH water. This gas is passed to a drying zone 43 of molecular sieve. The drying zone 43 also drys the recycle gas from the ammonia synthesis loop introduced by line 44.

The combined stream of fresh synthesis gas and recycled synthesis gas is introduced by line 45 at a temperature of about 38° C. and a pressure of 33 atmospheres to a recycle gas compressor 46 to provide a synthesis gas at a rate of 64492.6 MPH at approximately 47° C. and 36 atmospheres by line 47 to an ammonia synthesis converter 48. The ammonia synthesis converter 48 has three catalyst beds containing totally 10,829 cubic feet of commercial ammonia synthesis catalyst. The exit pressure to synthesis converter 48 is 35 atmospheres, and the gases have a temperature of about 377° C. The ammonia synthesis effluent is removed by line 49 and after cooling in heat exchanger 50 is introduced by line 51 to ammonia absorber 52 for removal of the ammonia in the ammonia synthesis effluent. The recycle gas from the ammonia water wash scrubber 52 in recycle line 44 is 33,347.4 MPH hydrogen, 11,116 MPH nitrogen, 6,319.5 MPH methane, 2,450.5 MPH argon, essentially 0 MPH ammonia, and 100.2 MPH water. A gas purge is taken from line 44 by line 53 to prevent build-up of methane and argon in the ammonia synthesis loop. A two stage ammonia absorber is used as the scrubbing means 52, and the water-ammonia mixture from the last stage of the absorber has a composition of 5786.8 MPH ammonia and 7991.2 MPH water of the total 13,782.5 MPH which is circulated by line 54 to the distillation column 32. The water-ammonia mixture introduced to column 32 is heated by means of the heat exchange with the effluent of the shift converter passing in exchanger 31 as set forth hereinabove. The ammonia is removed overhead in line 55, is cooled by heat exchanger 56 and introduced by line 57 to a condensing vessel 58. The liquid ammonia in vessel 58 is at a temperature of about 38° C. and a pressure of about 15 atmospheres. A small amount of inerts is vented by line 59 while some of the liquid ammonia is recycled by line 60 to distillation column 32. The water recovered from the bottom of distillation column 32 is recycled by line 61 to scrubber or ammonia absorber 52. Make-up water at a rate 160 MPH is introduced by line 62.

Figure 2:
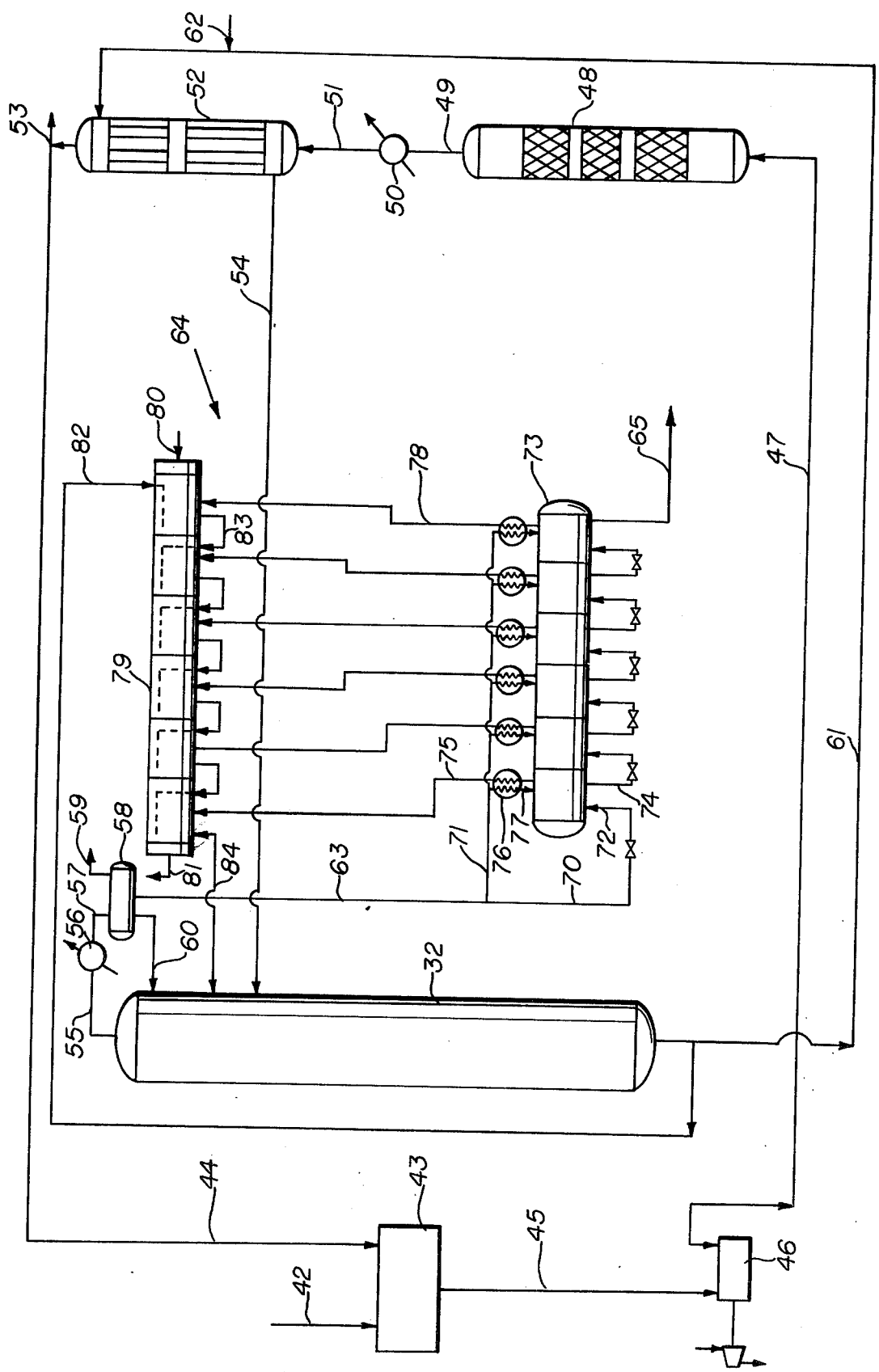
FIG. 2 is a flow diagram which illustrates the refrigeration system of the present invention.

In some instances the liquid ammonia at conditions in condensing vessel 58 may be used in certain processes; however, in most instances the anhydrous ammonia is to be stored at ambient pressure and is thus removed by line 63 where it is cooled in an absorption refrigeration unit 64, as described in more detail with regard to FIG. 2, and removed to storage by line 65. A specific embodiment of an absorption refrigeration unit 64 is illustrated in FIG. 2. The reference numerals used in FIG. 2 refer to the same streams and pieces of equipment as shown in FIG. 1. Thus, while not shown in FIG. 2 the distillation column 32 is heated by the side reboilers or heat exchanger 31 as set forth in detail in FIG. 1. Further, in FIG. 2, the ammonia absorber 52 is shown as a vertical wetted wall exchanger absorber.

Referring to FIG. 2, the liquid ammonia which is recovered by line 63 is split into two lines 70 and 71. The ammonia in line 70 is passed through a pressure letdown valve 72 before being passed into flash vessel 73 wherein there are six stages. As the ammonia is flashed, it is cooled and a portion of the ammonia is recovered as a liquid by line 74 whereas a portion is removed by line 75 as a vapor. A portion of the vapor is passed in heat exchange through heat exchanger 76 with a portion of the ammonia from line 71 passed by line 77 through a letdown valve (not shown) into the first stage of flash vessel 73. This operation is repeated in each of the stages until in the last stage the liquid is removed by line 65 at ambient pressure and at −33.3° C. The vapor in line 78 is at ambient pressure.

The vapors from the flash vessel are collected in a water absorber 79 which may be a shell and tube heat exchanger. Into the tubes by line 80 is in introduced water or other cooling media which is passed through the tubes and removed by line 81. The water or other cooling media is heated by the heat of absorption. The absorber 79 has six stages similarly as the flashing vessel 73. Water is removed from the bottom of distillation column 32 and is introduced by line 82 into the first stage of the absorber 79. The water is introduced as a spray or other manner on the shell side so as to come into intimate contact with the vapors introduced by line 78. The aqua-ammonia mixture is removed by line 83 from the first absorption stage and introduced into the second stage again as a spray or other means to provide intimate contact with the vapor being introduced to that stage of the absorber 79. This is carried out in each successive stage until the vapor introduced by line 75 is absorbed in the last stage of the absorber 79. The aqua-ammonia mixture from the last stage is removed by line 84 and introduced into the distillation column 32.

The fully integrated ammonia synthesis loop of the present invention provides a substantial energy savings over the present day commercial ammonia process. An estimated savings of 2 to 6 MMBTU/ST of ammonia is made possible by using the synthesis loop of the present invention.

The nature and objects of the present invention having been completely described and illustrated and the best made thereof set forth, what I wish to claim as new and useful and secure by Letters Patent is:

1. In a process for the production of ammonia which comprises a series of process steps including producing a raw synthesis gas and converting the carbon monoxide in said raw synthesis gas to carbon dioxide for producing a synthesis gas containing a mixture of hydrogen and nitrogen in approximately a 3 to 1 ratio, the improvement which comprises:
reacting said hydrogen and nitrogen in an ammonia synthesis converter at pressures less than 100 atmospheres to produce an effluent containing ammonia;
scrubbing said effluent with water to form a water-ammonia mixture;
distilling ammonia from said water-ammonia mixture by means of a distillation column heated by removing liquid therefrom at several levels; and
passing in indirect heat exchange with said liquid the effluent from one of said process steps.

2. A process according to claim 1 wherein said synthesis pressure is within the range of 20 to 70 atmospheres.

3. A process according to claim 1 wherein one of said process steps is a shift conversion process and the effluent from said process provides heat for distilling said water-ammonia mixture.

4. A process according to claim 3 wherein said synthesis pressure is within the range of 25 to 50 atmospheres.

5. A process according to claim 1 wherein the unabsorbed gases in the ammonia synthesis converter effluent after scrubbing are recycled to said ammonia synthesis converter.

6. In a process for the production of ammonia, comprising the steps of:
(a) producing a raw synthesis gas which contains hydrogen and carbon monoxide;
(b) converting the carbon monoxide in said raw synthesis gas to carbon dioxide and further hydrogen by the addition of steam;
(c) scrubbing the gas to remove the carbon dioxide; and
(d) purifying said scrubbed gas to produce a synthesis gas containing a mixture of hydrogen and nitrogen in approximately a 3 to 1 ratio
the improvement which comprises
reacting said hydrogen and nitrogen in an ammonia synthesis converter at pressures less than 100 atmospheres to produce an effluent containing ammonia;
scrubbing said effluent with water to form a water-ammonia mixture;
distilling ammonia from said water-ammonia mixture by means of a distillation column heated by removing liquid therefrom at several levels; and
passing in indirect heat exchange with said liquid the effluent from step (b).

7. A process according to claim 6 wherein said synthesis pressure is within the range of 20 to 70 atmospheres.

8. A process according to claim 6 wherein the step of producing a raw synthesis gas is accomplished by primary steam reforming and secondary steam reforming.

9. A process according to claim 8 wherein said synthesis pressure is within the range of 25 to 30 atmospheres.

10. A process according to claim 8 wherein the pressure in said steam reforming and said synthesis pressures is within the range of 25 to 50 atmospheres.

11. In a process for the production of ammonia, comprising the steps of:
(a) producing a hydrogen-rich gas by the primary steam reforming of a hydrocarbon;
(b) producing a raw synthesis gas by the secondary steam reforming of said hydrogen-rich gas;
(c) converting the carbon monoxide in said reformed gas to carbon dioxide and further hydrogen by the addition of steam;
(d) scrubbing the gas to remove the carbon dioxide and
(e) purifying said scrubbed gas to produce a synthesis gas containing a mixture of hydrogen and nitrogen in approximately a 3 to 1 ratio
the improvement which comprises
reacting said hydrogen and nitrogen in an ammonia synthesis converter at pressures less than 100 atmospheres to produce an effluent containing ammonia;
scrubbing said effluent with water to form a water-ammonia mixture;
distilling ammonia from said water-ammonia mixture by means of a distillation column heated by removing liquid therefrom at several levels; and
passing in indirect heat exchange with said liquid the effluent from step (c).

12. A process according to claim 11 wherein the pressure of the effluent from step (a) and said synthesis pressure is within the range of about 33 to 41 atmospheres.

13. A low energy ammonia synthesis loop which comprises
- means for the synthesis of ammonia from a synthesis gas at low pressures;
- means for scrubbing the effluent of the synthesis means with water to form a water-ammonia mixture;
- a distillation column for distilling the water-ammonia mixture having a plurality of side reboilers for heating the water-ammonia mixture from said distillation column; and
- means for passing in indirect heat exchange with the water-ammonia mixture in said side reboilers the effluent of the shift conversion process used in preparing said synthesis gas to distill the ammonia from the water-ammonia mixture.

14. A low energy ammonia synthesis loop for an ammonia plant which comprises
- (a) means for producing a raw synthesis gas which contains hydrogen and carbon monoxide;
- (b) shift conversion means for converting the carbon monoxide in said raw synthesis gas to carbon dioxide and further hydrogen by the addition of steam;
- (c) scrubbing means for removing the carbon dioxide from the gas; and
- (d) purifying means for producing a synthesis gas containing a mixture of hydrogen and nitrogen in approximately a 3 to 1 ratio the improvement which comprises
- an ammonia synthesis converter for reacting said hydrogen and nitrogen at low pressures to produce an effluent containing ammonia;
- scrubbing means for scrubbing said effluent with water to form a water-ammonia mixture;
- a distillation column having a plurality of side reboilers wherein the water-ammonia mixture is heated for recovering ammonia from said water-ammonia mixture; and
- means for passing in indirect heat exchange with the water-ammonia mixture in said side reboilers the effluent from said shift conversion means.

15. A synthesis loop according to claim 14 wherein said scrubbing means for scrubbing said effluent with water is a wetted wall absorber.

* * * * *